United States Patent
Jeong et al.

(10) Patent No.: US 9,439,156 B2
(45) Date of Patent: *Sep. 6, 2016

(54) MOBILE TERMINAL AND METHOD OF DISPLAYING IMAGE USING THE SAME

(71) Applicant: Samsung Electronics Co., Ltd., Suwon-si, Gyeonggi-do (KR)

(72) Inventors: Sang Soo Jeong, Suwon-si (KR); Soeng Hun Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 4 days.

This patent is subject to a terminal disclaimer.

(21) Appl. No.: 14/231,908

(22) Filed: Apr. 1, 2014

(65) Prior Publication Data

US 2014/0211727 A1 Jul. 31, 2014

Related U.S. Application Data

(63) Continuation of application No. 13/169,507, filed on Jun. 27, 2011, now Pat. No. 9,113,422.

(30) Foreign Application Priority Data

Jun. 28, 2010 (KR) .................. 10-2010-0061166
Oct. 22, 2010 (KR) .................. 10-2010-0103549

(51) Int. Cl.
*H04W 52/36* (2009.01)
*H04W 52/24* (2009.01)
(Continued)

(52) U.S. Cl.
CPC .......... *H04W 52/243* (2013.01); *H04L 5/0066* (2013.01); *H04W 52/146* (2013.01); *H04W 52/288* (2013.01); *H04W 52/325* (2013.01); *H04W 52/34* (2013.01);
(Continued)

(58) Field of Classification Search
CPC ........... H04W 52/365; H04W 52/146; H04W 52/243; H04L 5/0066
See application file for complete search history.

(56) References Cited

U.S. PATENT DOCUMENTS 8,570,957 B2 * 10/2013 Ball .................... H04W 52/367
370/329
2004/0038697 A1 2/2004 Attar et al.
(Continued)

FOREIGN PATENT DOCUMENTS

CN 1627845 A 6/2005
CN 101340622 A 1/2009
(Continued)

OTHER PUBLICATIONS

"Transmissuin Power & PHR handing in CA", 3GPP Draft; R2-103550, XP050451125; Jun. 28-Jul. 2, 2010.
(Continued)

*Primary Examiner* — Edward Urban
*Assistant Examiner* — Ralph H Justus
(74) *Attorney, Agent, or Firm* — Jefferson IP Law, LLP

(57) ABSTRACT

An information format and apparatus used by a base station to make a scheduling decision when the base station allocates resource to a terminal in a mobile communication system are provided. Operations of a terminal to report a maximum transmission power accurately to the base station in a scheduling process are also provided. A method for calculating a maximum transmit power in a constant manner regardless of a channel status is also provided.

20 Claims, 13 Drawing Sheets

(51) Int. Cl.
*H04L 5/00* (2006.01)
*H04W 52/14* (2009.01)
*H04W 52/28* (2009.01)
*H04W 52/32* (2009.01)
*H04W 52/34* (2009.01)
*H04W 88/08* (2009.01)
*H04W 88/02* (2009.01)

(52) U.S. Cl.
CPC ....... *H04W 52/346* (2013.01); *H04W 52/365* (2013.01); *H04W 52/367* (2013.01); *H04W 52/36* (2013.01); *H04W 88/02* (2013.01); *H04W 88/08* (2013.01)

(56) References Cited

U.S. PATENT DOCUMENTS

| | | |
|---|---|---|
| 2004/0116143 A1 | 6/2004 | Love et al. |
| 2006/0286994 A1 | 12/2006 | Kwak et al. |
| 2008/0279121 A1 | 11/2008 | Englund et al. |
| 2009/0097444 A1 | 4/2009 | Lohr et al. |
| 2009/0197629 A1 | 8/2009 | Borran et al. |
| 2009/0245191 A1 | 10/2009 | Ball et al. |
| 2009/0310501 A1* | 12/2009 | Catovic ................ H04W 24/08 370/252 |
| 2010/0158147 A1* | 6/2010 | Zhang ................ H04W 52/146 375/260 |
| 2011/0038271 A1* | 2/2011 | Shin .................... H04W 52/146 370/252 |
| 2011/0086663 A1 | 4/2011 | Gorokhov et al. |
| 2011/0105173 A1* | 5/2011 | Haim .................. H04W 52/244 455/522 |
| 2011/0312366 A1* | 12/2011 | Yang .................. H04W 52/365 455/522 |

FOREIGN PATENT DOCUMENTS

| | | |
|---|---|---|
| CN | 102308640 A | 1/2012 |
| EP | 2521279 A1 | 11/2012 |
| JP | 2013-520917 A | 6/2013 |
| RU | 2366088 C2 | 8/2009 |

OTHER PUBLICATIONS

Nokia Siemens Networks et al.: "Deatils of PHR for carrier aggregation", 3GPP Draft; R2-103558, XP050605217, Jun. 28-Jul. 2, 2010.
Ericsson, UE Transmission Power Headroom Report for LTE, 3GPP TSG RAN WG2 #60bis, Jan. 2008, Sevilla, Spain.
Bell et al., Power Headroom Reporting for Carrier Aggregation, 3GPP TSG-RAN WG1 #60bis, Apr. 12, 2010, Beijing, China.
Bell et al., Power Headroom Reporting for Carrier Aggregation, 3GPP TSG-RAN WG1 #61, May 10, 2010, Montreal, Canada.
3GPP TS 36.101 V9.3.0 (Mar. 2010), 3rd Generation Partnership Project; Technical Specification Group Radio Access Network; Evolved Universal Terrestrial Radio Access (E-UTRA); User Equipment (UE) radio transmission and reception (Release 9).
RAN1; LS on power headroom reporting for carrier aggregation; R1-103405; 3GPP TSG RAN WG1 Meeting #61; May 10-14, 2010; Montreal, Canada.
Qualcomm Incorporated; LTE-A UL power control; R4-102401; 3GPP TSG-RAN WG4AH#3; Jun. 28-Jul. 2, 2010; Bratislava, Slovakia.
Ericsson et al.; Details of PHR Handling for CA; 3GPP TSG-RAN WG2 #70bis; Tdoc R2-103570; Jun. 28-Jul. 2, 2010; Stockholm, Sweeden.
Ericsson; Summary of e-mail discussion [170#15] LTE CA: PHR Handling; 3GPP TSG-RAN WG2 #70bis; Tdoc R2-103580; Jun. 28-Jul. 2, 2010; Stockholm, Sweeden.
Alcatel-Lucent et al.; Discussion on Per UE Power Headroom Reporting; 3GPP TSG-RAN WG1 #62bis; R1-105195; Oct. 11-15, 2010; Xi'an, China.

* cited by examiner

MOBILE TERMINAL AND METHOD OF DISPLAYING IMAGE USING THE SAME

PRIORITY

This application is a continuation application of a prior application Ser. No. 13/169,507, filed on Jun. 27, 2011, which claimed the benefit under 35 U.S.C. §119(a) of Korean patent applications filed on Jun. 28, 2010 and Oct. 22, 2010 in the Korean Intellectual Property Office and assigned Serial Nos. 10-2010-0061166 and 10-2010-0103549, respectively, the entire disclosures of which are hereby incorporated by reference.

BACKGROUND OF THE INVENTION

1. Field of the Invention

The present invention relates to a mobile communication system. More particularly, the present invention relates to a method and apparatus of a mobile terminal for reporting a maximum transmission power to assist scheduling decision making of a base station in the wireless communication system.

2. Description of the Related Art

Mobile communication systems were developed to provide subscribers with voice communication services on the move. With the advance of technologies, the mobile communications have been evolved to support high speed data communication services as well as the standard voice communication services.

Recently, as a next generation mobile communication system, Long Term Evolution (LTE) is being standardized by the 3rd Generation Partnership Project (3GPP). LTE is designed to provide for a downlink speed of up to 100 Mbps. In order to fulfill the requirements of the LTE systems, studies have been done of various aspects including minimization of the number of involved nodes in the connections and placing the radio protocol as close as possible to the radio channels.

In the meantime, unlike the standard voice service, most data services are allocated resources according to the amount of data to be transmitted and channel conditions. Accordingly, in the wireless communication system such as a cellular communication system, it is important to manage resource allocation based on the resource scheduled for data transmission, channel condition, and a data amount to be transmitted. This is true even in the LTE system, and the base station scheduler manages and assigns radio resources.

In the LTE system, the User Equipment (UE) provides the evolved Node B (eNB) with scheduling information to assist uplink scheduling. The scheduling information includes a Buffer Status Report (BSR) and a Power Headroom Report (PHR). Particularly, PHR is used to prevent the total transmit power from exceeding the maximum transmit power limit when the eNB assigns the resources of uplink transmission of the UE. Since inaccurate PHR information causes scheduling errors or interference to other transmissions, it is very important for the eNB to interpret the PHR reported by the UE correctly.

SUMMARY OF THE INVENTION

Aspects of the present invention are to address at least the above-mentioned problems and/or disadvantages and to provide at least the advantages described below. Accordingly, an aspect of the present invention is to provide a method, apparatus, and system for processing scheduling information effectively in a mobile communication system.

Another aspect of the present invention is to provide a method, apparatus, and system for processing scheduling information efficiently between a User Equipment (UE) and an evolved Node B (eNB) in a mobile communication system.

Furthermore, an aspect of the present invention provides a method, apparatus, and system for improving an accuracy of an available transmit power report of a UE in a mobile communication system.

According to an aspect of the present invention, a method for improving an accuracy of a power headroom report used in scheduling of the base station in a mobile communication system is provided. The method includes determining a maximum transmit power of a cell ($P_{CMAX}$) for use in calculation of the power headroom, and transmitting the $P_{CMAX}$ to the base station.

In the mobile communication system according to an aspect of the present invention, when a terminal determines a $P_{CMAX}$, the same $P_{CMAX}$ is selected in both cases where the power reduction is not necessary due to the required Physical Uplink Shared CHannel (PUSCH) power being significantly lower than $P_{CMAX}$ and where the power reduction probability is very high due to the required PUSCH power being similar to the $P_{CMAX}$.

In the mobile communication system according to an aspect of the present invention, the $P_{CMAX}$ is indicated with two bits in order to reduce the overhead for reporting $P_{CMAX}$ to the base station, and the $P_{CMAX}$ is carried by two reserved bits of power headroom Medium Access Control (MAC) Control Element (CE).

In the mobile communication system according to an aspect of the present invention, the MAC CE format for transmitting accurate $P_{CMAX}$ value to the base station and $P_{CMAX}$ report trigger conditions are included.

In the mobile communication system according to an aspect of the present invention, the base station manages the $P_{CMAX}$ values reported by the terminal in the form of a database, requests, when a scheduling situation is omitted, the terminal to report $P_{CMAX}$, and transmits an uplink grant reflecting the scheduling situation.

In more detail, the scheduling information report method of a terminal in a mobile communication system according to an aspect of the present invention includes selecting, when uplink transmission is triggered, a maximum transmit power ($P_{CMAX}$) between a highest value and a lowest value for the maximum transmit power; determining, when Power Headroom Report (PHR) is triggered, a Power Headroom (PH) of the terminal using the selected maximum transmit power; and transmitting a PHR message including the maximum transmit power and the PH to a base station.

The terminal for reporting scheduling information in a mobile communication system according to an aspect of the present invention includes a transceiver for transmitting the scheduling information to a base station and for receiving a control message transmitted by the base station and a controller for controlling to select, when uplink transmission is triggered, a maximum transmit power ($P_{CMAX}$) between a highest value and a lowest value for the maximum transmit power, to determine, when a PHR is triggered, a PH of the terminal using the selected maximum transmit power, and to transmit a power headroom report message, including the maximum transmit power and the power headroom, to a base station.

The scheduling information processing method of a base station in a mobile communication system according to an aspect of the present invention includes receiving scheduling information transmitted by a terminal, the scheduling information including a maximum transmit power and a power headroom, storing the scheduling information, and assigning resources to the terminal based on the stored scheduling information.

The base station for processing scheduling information in a mobile communication system according to an aspect of the present invention includes a transceiver for receiving scheduling information transmitted by a terminal, the scheduling information including a maximum transmit power and a power headroom, a storage for storing the scheduling information, and a controller for assigning resources to the terminal based on the scheduling information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the exemplary embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention relate to a method and apparatus of a User Equipment (UE) for reporting a maximum transmit power to assist scheduling decision making of an evolved Node B (eNB) in a mobile communication system. Prior to the explanation of the exemplary embodiments of the present invention, a description is made of a Long Term Evolution (LTE) mobile communication system with reference to FIGS. 1 and 2.

Figure 1:
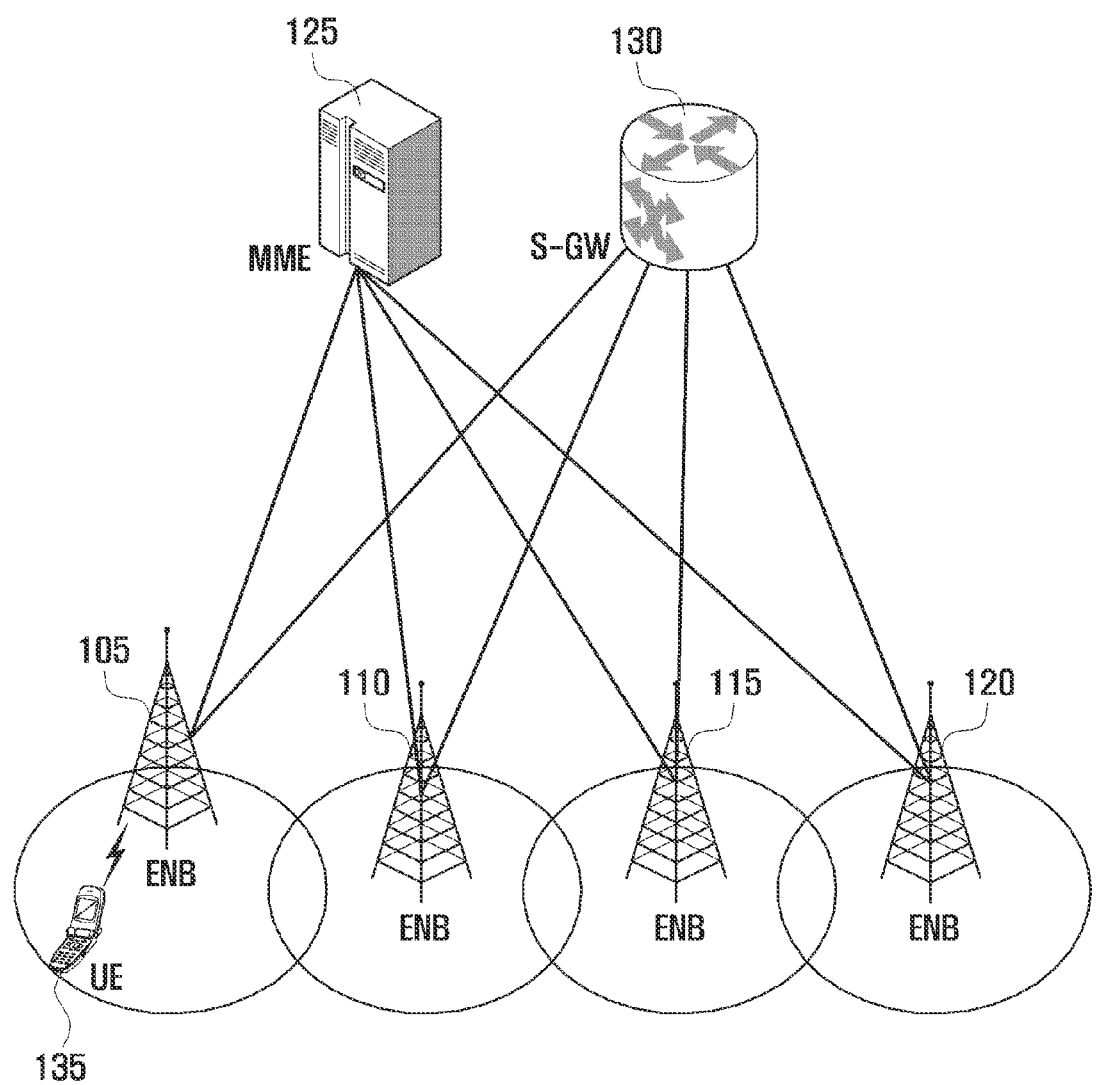
FIG. 1 is a schematic diagram illustrating an exemplary architecture of a Long Term Evolution (LTE) mobile communication system according to the related art.

FIG. 1 is a schematic diagram illustrating an exemplary architecture of an LTE mobile communication system according to the related art.

Referring to FIG. 1, the radio access network of the LTE mobile communication system includes a plurality of eNBs 105, 110, 115, and 120, a Mobility Management Entity (MME) 125, and a Serving-Gateway (S-GW) 130. The UE 135 connects to an external network via an eNB and S-GW 130.

Each of the eNBs 105, 110, 115, and 120 corresponds to the legacy Node B of the Universal Mobile Telecommunications System (UMTS). The eNB is coupled with the UE 135 and is responsible for more complicated functions as compared to a legacy Node B.

In LTE, all types of user traffic, including real time services such as Voice over Internet Protocol (VoIP), are transmitted over a shared channel, and thus there is a need for a device (such as eNBs 105, 110, 115, and 120) for scheduling data transmission based on status information collected from the UEs. Typically, an eNB controls a plurality of cells. LTE adopts Orthogonal Frequency Division Multiplexing (OFDM) to support up to 20 MHz bandwidth. LTE also employs Adaptive Modulation and Coding (AMC) to determine a modulation scheme and a channel coding rate adaptive to a channel condition of the UE.

The S-GW 130 is responsible for providing data bearers so as to establish or release a data bearer under the control of the MME 125. The MME 125 is responsible for various control functions and is coupled to a plurality of eNBs.

Figure 2:
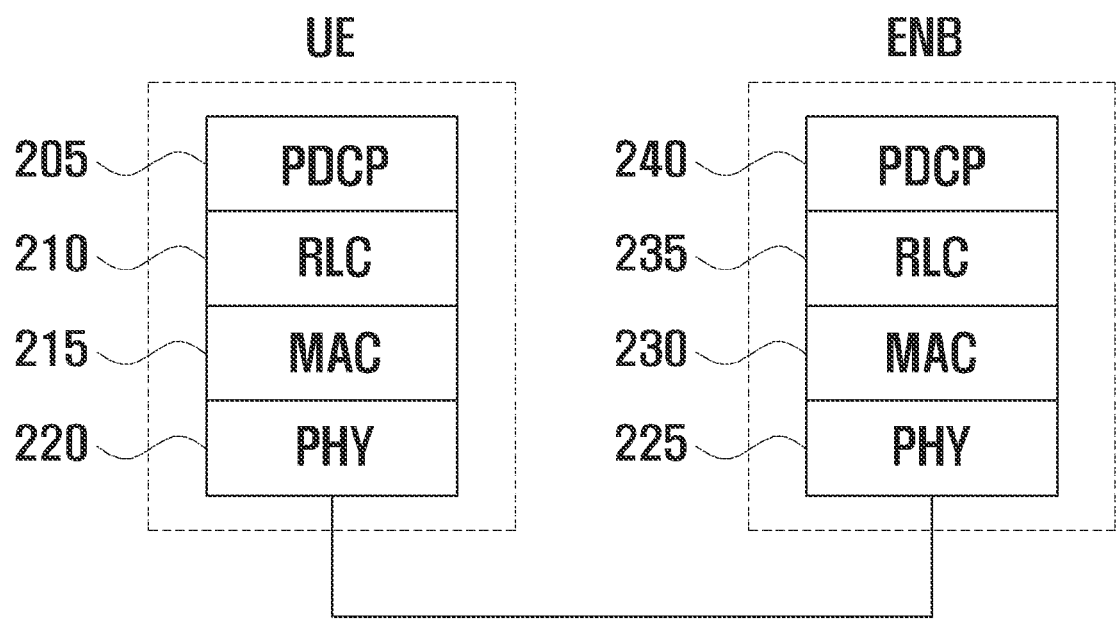
FIG. 2 is a diagram illustrating a protocol stack for a User Equipment (UE) and an evolved Node B (eNB) in the LTE mobile communication system of FIG. 1 according to the related art.

FIG. 2 is a diagram illustrating a protocol stack for a UE and an eNB in the LTE mobile communication system of FIG. 1 according to the related art.

Referring to FIG. 2, the LTE protocol stack includes Packet Data Convergence Protocol (PDPC) layer 205 and 240, Radio Link Control (RLC) layer 210 and 235, Medium Access Control (MAC) layer 215 and 230, and physical layer (PHY) 220 and 225.

The PDCP layer 205 and 240 is responsible for Internet Protocol (IP) header compression/decompression, and the RLC layer 210 and 235 is responsible for packing the PDCP Packet Data Units (PDUs) into a size appropriate for transmission and for performing an Automatic Repeat Request (ARQ) function. The MAC layer 215 and 230 serves multiple RLC layer entities and multiplexes the RLC PDUs into a MAC PDU and de-multiplexes a MAC PDU into the RLC PDUs. The physical layer PHY 220 and 225 is responsible for encoding and modulation of the upper layer data to transmit through a radio channel, and demodulation and decoding of an OFDM symbol received through radio channel to deliver to upper layers. From the viewpoint of a transmitter, the data unit input to a protocol entity is called Service Data Unit (SDU) and the data unit output from the protocol entity is called Protocol Data Unit (PDU).

In the LTE mobile communication system, since the uplink transmission causes interference to transmissions on other bandwidths, it is necessary to limit the uplink transmit power below a predetermined level. That is, spurious emission limitations should be met. For this purpose, the UE calculates uplink transmit power using a predetermined function, and performs uplink transmission at the calculated uplink transmit power level. For example, the UE calculates the required uplink transmit power value by applying the scheduling information such as an allocated resource amount and Modulation and Coding Scheme (MCS) to be adopted, and input values for estimating channel status such as path-loss value, and performs uplink transmission with the calculated required uplink transmit power value. The uplink transmit power value available for the UE is limited by the maximum transmit power value of the UE and, if the calculated required uplink transmit power value is greater than the maximum transmit power value, the UE performs the uplink transmission with the maximum transmit power value. In this case, since the uplink transmit power is less than the calculated required power, the uplink transmission quality is likely degraded. Accordingly, it is preferable for the eNB to perform scheduling such that the required transmit power does not exceed the maximum transmit power. However, since some parameters such as path-loss cannot be checked by the eNB, the UE reports its power headroom by transmitting the Power Headroom Report (PHR) if necessary.

Figure 3:
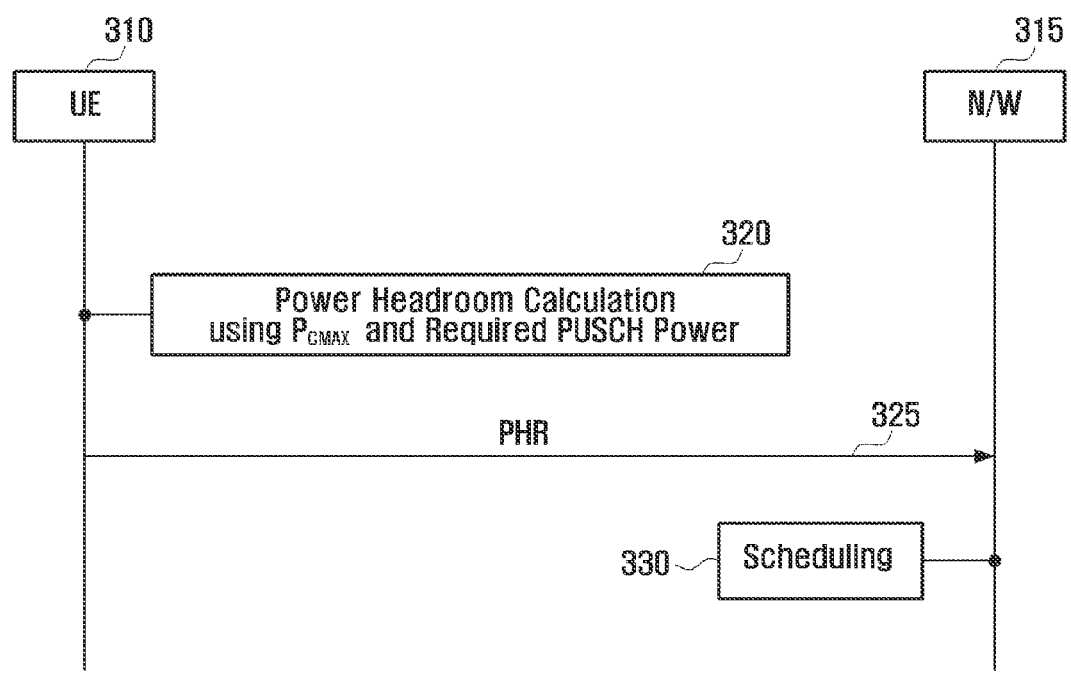
FIG. 3 is a signaling diagram illustrating operations of a UE and a network for scheduling based on a Power Headroom Report (PHR) in an LTE system according to an exemplary embodiment of the present invention.

FIG. 3 is a signaling diagram illustrating operations of a UE and network for scheduling based on PHR in an LTE mobile communication system according to an exemplary embodiment of the present invention.

Referring to FIG. 3, in the LTE system, the UE 310 calculates the power headroom by equation (1):

Power Headroom=$P_{CMAX}$−Required PUSCH Power (1)

In equation (1), $P_{CMAX}$ denotes the maximum transmit power of the UE, and Required PUSCH Power denotes the transmit power assigned for the uplink transmission of the UE. Here, PUSCH means Physical Uplink Shared Channel. The UE calculates the Power Headroom using equation (1) at step 320 and reports the Power Headroom to the eNB Network (N/W) interface 315 at step 325, and the eNB 315 determines a number of Resource Blocks (RBs) and MCS per transmission resource with which the transmit power does not exceed the maximum transmit power at scheduling step 330.

Figure 4:
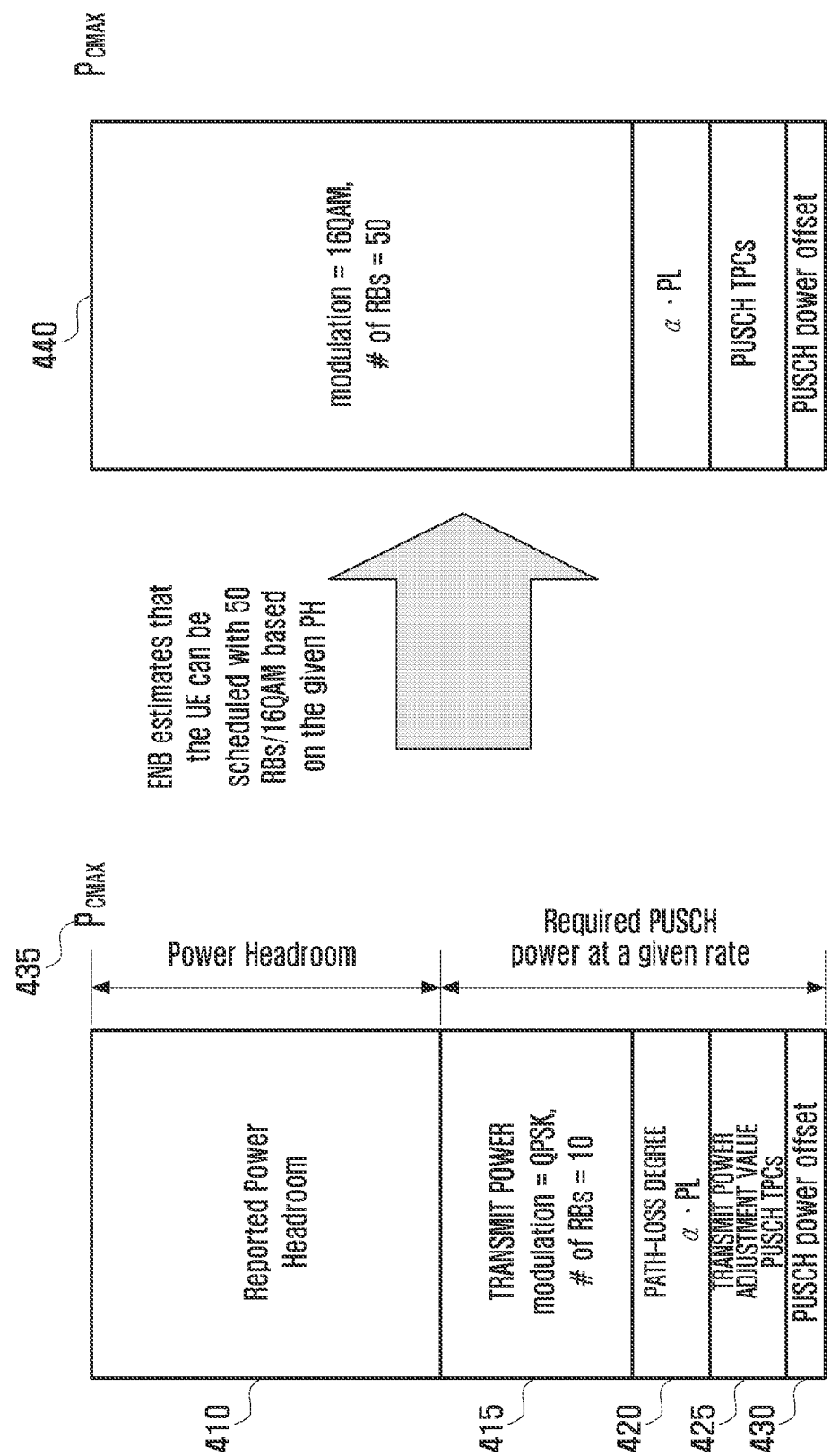
FIG. 4 is a diagram illustrating an exemplary situation of a transmit power control based on a PHR in the mobile communication system operating as shown in FIG. 3 according to an exemplary embodiment of the present invention.

FIG. 4 is a diagram illustrating an exemplary situation of a transmit power control based on PHR in the LTE mobile communication system operating as shown in FIG. 3 according to an exemplary embodiment of the present invention.

As aforementioned, the Power Headroom 410 is a value obtained by subtracting the required PUSCH power from $P_{CMAX}$ 435, and the required PUSCH power is a value determined depending on the transmit power 415 under the given modulation scheme and number of RBs, path-loss degree 420, transmit power adjustment value to be applied to PUSCH 425, and transmit power offset of PUSCH 430. The calculated power headroom 410 is reported to the eNB by means of PHR, and the eNB makes scheduling decisions based on the PHR as denoted by reference number 440.

The operation depicted in FIG. 4 is carried out normally when the power headroom value reported to the eNB through PHR is accurate. In equation (1), the required PUSCH power can be maintained without additional signaling between the eNB and UE. Meanwhile, $P_{CMAX}$ 435 is a parameter can be set to a certain value by the UE. According to the LTE standard, $P_{CMAX}$ is selected by the UE between the lowest value and the highest value according to equation (2):

$$P_{CMAX\_L} \leq P_{CMAX} \leq P_{CMAX\_H}$$ (2)

In equation (2), $P_{CMAX}$ Low ($P_{CMAX\_L}$) and $P_{CMAX}$ High ($P_{CMAX\_H}$) are calculated by equations (3) and (4), respectively.

$$P_{CMAX\_L}=\text{MIN}\{P_{EMAX}-\Delta T_C, P_{powerClass}-MPR-A-MRP-\Delta T_c\}$$ (3)

$$P_{CMAX\_H}=\text{MIN}\{P_{EMAX}, P_{PowerClass}\}$$ (4)

where $P_{EMAX}$, $\Delta T_C$, $P_{PowerClass}$, Maximum Power Reduction (MPR), and Additional MPR (A-MPR) are as specified in TS36.101 and can be simply explained as follows. $P_{EMAX}$ is a maximum uplink transmit power of the cell in which the UE is located and notified to the UE by the eNB. $P_{PowerClass}$ means a maximum transmit power derived from physical characteristics of the UE. The power class is determined at the manufacturing stage, and the UE notifies the eNB of the power class by means of a Radio Resource Control (RRC) message. MPR, A-MPR, and $\Delta T_C$ are parameters for defining a limit value for the UE to adjust the maximum transmit power in order to meet the spurious emission to a certain requirement. MPR is the value determined by the amount of the allocated transmission resource (i.e., bandwidth) and modulation scheme, and the values of MPR for individual cases are defined in table 6.2.3.-1 of TS36.101. A-MPR is the value defined by the frequency band for uplink transmission, local characteristic, and uplink transmission bandwidth and defined in tables 6.2.4-1, 6.2.4-2, and 6.2.4-3 of TS36.101. A-MPR is used for the case where there is a frequency band sensitive to the spurious emission around according to the local characteristics and frequency band characteristics. $\Delta T_C$ is used for additional transmit power adjustment in a case where the uplink transmission is performed around the edges of the frequency band. If the uplink transmission is performed in the lowest 4 MHz bandwidth or the highest 4 MHz bandwidth of a certain frequency band, the UE sets $\Delta T_C$ to 1.5 dB, and otherwise to 0.

As shown in equation (2), since $P_{CMAX}$ is selected by the UE from the highest value and the lowest value, it is necessary for the UE to report the $P_{CMAX}$ as well as the power headroom value for accurate scheduling decision making of the eNB base on PHR.

Table 1 shows the variation of $P_{CMAX\_L}$ according to the UE's situation and the variation of range in which $P_{CMAX}$ is selected. In Table 1, it is noted that the range in which $P_{CMAX}$ is selectable is 8 dBm in case 3 and this means that the maximum value of $P_{CMAX}$ is about 6 times greater than its minimum value.

Figure 6:
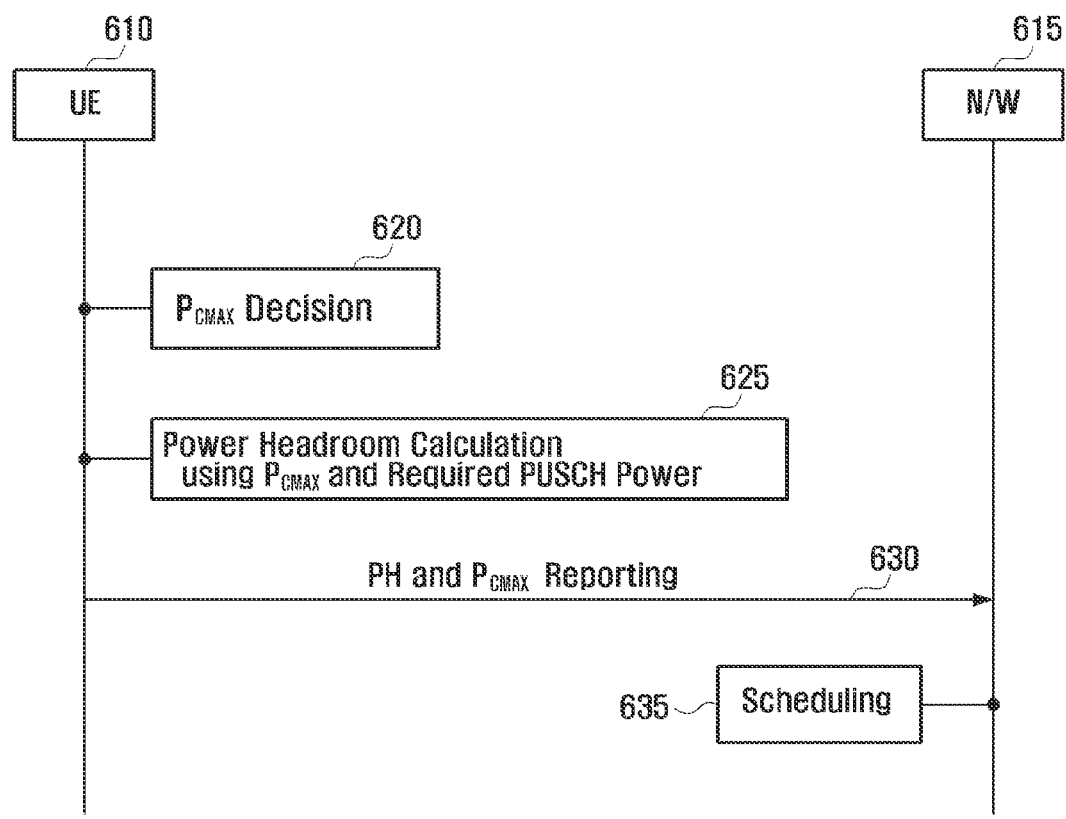
FIG. 6 is a signaling diagram illustrating operations of a UE and a network for scheduling of an eNB based on a Power Headroom (PH) value and $P_{CMAX}$ reported by the UE according to an exemplary embodiment of the present invention.

Referring to FIG. 6, the UE 610 determines the $P_{CMAX}$ according to the situation at step 620, calculates the power headroom based on the $P_{CMAX}$ at step 625, and reports the power headroom and $P_{CMAX}$ to the eNB Network (N/W) interface 615 at step 630. The eNB 615 makes scheduling decisions accurately based on this information at step 635.

In an exemplary embodiment of the present invention, the UE is configured to select a same $P_{CMAX}$ value always, regardless of the required PUSCH power in calculation of the power headroom. That is, for both the cases where the required PUSCH power is significantly less than $P_{CMAX}$ such that $P_{CMAX}$, regardless of its value, does not influence to the current transmission of the UE and where the required PUSCH power is similar to $P_{CMAX}$ such that $P_{CMAX}$ influences a current transmission of the UE significantly, $P_{CMAX}$ is set to the same value.

A description is made with reference to the relationship between the above-described required PUSCH power and $P_{CMAX}$. Suppose that the required PUSCH power is high due to a bad channel condition between the UE and the eNB. In this case, the required PUSCH power may be similar to $P_{CMAX}$ or, in some bad channel conditions, greater than $P_{CMAX}$. If the required PUSCH power is greater than $P_{CMAX}$, the UE adjusts the transmit power to match $P_{CMAX}$ (power reduction) to meet the spurious emission requirement, and in this case the value set for $P_{CMAX}$ influences the system performance significantly. If $P_{CMAX}$ is set to a value too

TABLE 1

| Case | $P_{CMAX\_L}$ | Note |
| --- | --- | --- |
| 1. UE is scheduled with 20 RBs/16QAM in 20 MHz cell: MPR = 2 dB. | MIN ($P_{CMAX}$ – $\Delta T_C$ Pc– MPR – A-MPR – $\Delta T_c$) = MIN (23-0, 23-2-0-0) = 21 dBm | UE Choose its $P_{CMAX}$ in (21-23 dBM) |
| 2. UE is scheduled with 19 RBs/QPSK in 20 MHz cell: MPR = 1 dB UE is signalled with NS_03 and is operating in band 2: A-MFR = 1 dB The scheduled resource is at the edge of band 2:$\Delta T_C$ = 1.5 dB | MIN (23-1.5, 21-1-1-1.5) = 19.5 dBm | UE choose its $P_{CMAX}$ in (19.5-21 dBm) |
| 3. UE is signalled with NS_07 and in region A it is scheduled with 8 RBs whose RB indexes are 0-7 A-MFR = 8 dB | MIN (23-0, 23-0-8-8) = 15 dBm | UE choose its $P_{CMAX}$ in (15-23 dBm) |

Figure 5:
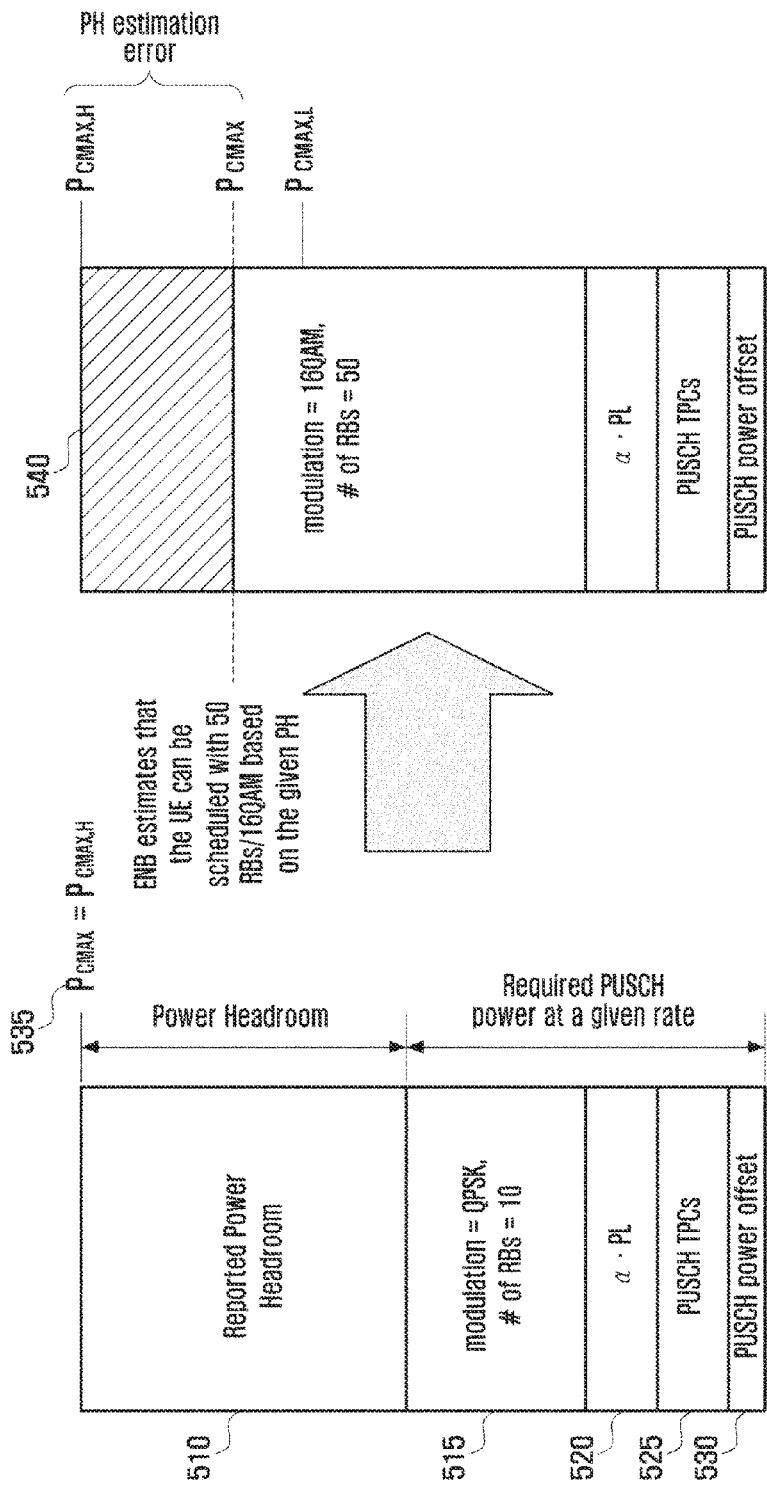
FIG. 5 is a diagram illustrating another exemplary situation of a transmit power control based on a PHR in the mobile communication system operating as shown in FIG. 3 when an eNB knows an incorrect maximum transmit power of a cell ($P_{CMAX}$) according to an exemplary embodiment of the present invention.

FIG. 5 is a diagram illustrating another exemplary situation of a transmit power control based on PHR in the LTE mobile communication system operating as shown in FIG. 3 when an eNB knows an incorrect $P_{CMAX}$ according to an exemplary embodiment of the present invention.

Referring to FIG. 5, in the case where the eNB has performed scheduling under the assumption of $P_{CMAX}$ 535 being equal to $P_{CMAX\_H}$ but the $P_{CMAX}$ set by the UE is actually less than the $P_{CMAX\_H}$, in order to use the entire allocated resource, it is require to use a transmit power greater than $P_{CMAX}$, resulting in failure to meet the Spurious Emission Requirement as denoted by reference number 540. RPH 510, Transmit Power 515, Path-Loss Degree 520, Transmit Power Adjustment Value 525, and PUSCH power offset 530 are determined the same as the corresponding elements of FIG. 4.

In order for the eNB to calculate the required PUSCH power from the power headroom reported by the UE, an exemplary embodiment of the present invention allows the UE to send to the eNB a $P_{CMAX}$ determined appropriately.

FIG. 6 is a signaling diagram illustrating operations of a UE and network for scheduling of an eNB based on a Power Headroom (PH) value and $P_{CMAX}$ reported by the UE according to an exemplary embodiment of the present invention.

small, the UE lowers the transmit value unnecessarily in spite of the availability of higher transmit power, resulting in frequent transmit errors. In contrast, if $P_{CMAX}$ is set to a value too large, it does not meet the spurious emission requirement, resulting in interference to adjacent frequency bands. Accordingly, in order to improve the system performance, it is advantageous for the UE to select a value greatest among the values meeting the spurious emission requirement in the rang e between $P_{CMAX\_L}$ and $P_{CMAX\_H}$.

Suppose that the required PUSCH power is very low, due to very good channel quality between the UE and eNB. In this case, since the required PUSCH power is low, it is possible to meet the spurious emission requirement regardless of the value of the $P_{CMAX}$. The simplest method for determining $P_{CMAX}$ appropriately for such case is to set $P_{CMAX}$ to the value of $P_{CMAX\_H}$. In this case, however, when it is required to adjust $P_{CMAX}$ afterward, i.e., when the required PUSCH power increases due to channel status degradation, the UE cannot provide the eNB with the information on the $P_{CMAX}$ to be used. As aforementioned, even when the $P_{CMAX}$ does not influence the current transmission due to the very low required PUSCH power, it is necessary to determine the $P_{CMAX}$ equally as in the situation in which the $P_{CMAX}$ is adjusted appropriately due to the high required PUSCH power.

For this purpose, when the required PUSCH power is very low, the UE determines $P_{CMAX}$ in consideration of a predetermined high required PUSCH power, e.g., a virtual required PUSCH power equal to $P_{CMAX\_H}$, rather than the actual required PUSCH power. It is noted that the virtual required PUSCH power is used only for determining $P_{CMAX}$ but the power headroom value is calculated using the actual required PUSCH power.

After determining $P_{CMAX}$, the UE should report the $P_{CMAX}$ to the eNB. Although $P_{CMAX}$ can be reported in various ways, the method using the power headroom MAC Control Element (CE) message as defined in the LTE standard is adopted in the first exemplary embodiment of the present invention.

First Exemplary Embodiment

Figure 7:
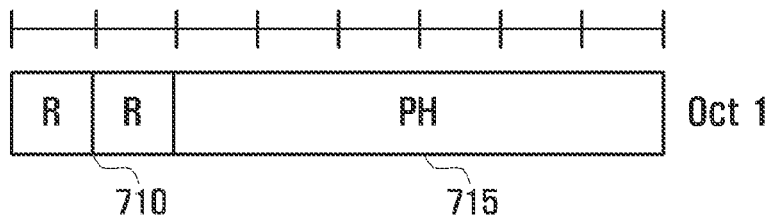
FIG. 7 is a diagram illustrating a format of a Power Headroom (PH) Medium Access Control (MAC) Control Element (CE) defined in the LTE standard according to a first exemplary embodiment of the present invention.

FIG. 7 is a diagram illustrating a format of the power headroom MAC CE defined in the LTE standard according to a first exemplary embodiment of the present invention.

Referring to FIG. 7, the power headroom MAC CE has a length of 1 octet with 6 bits 715 indicating a power headroom level. With 6 bits, it is possible to express 64 power headroom levels, and the index representing a power headroom level is transmitted on behalf of the value of the power headroom level itself Except for the 6 bits designated for the indication of the power headroom level, the remaining 2 bits 710 are reserved for future use. In the first exemplary embodiment of the present invention, a method for reporting the $P_{CMAX}$ value used for calculating PH value with the 2 reserved bits of the power headroom MAC CE is provided to avoid additional overhead. The UE can report one of four values of $P_{CMAX}$ with two bits. In the first exemplary embodiment of the present invention, three methods for reporting the $P_{CMAX}$ value to the eNB effectively are provided.

1) Method A

| Bit | Meaning |
|---|---|
| 00 | $P_{CMAX} = P_{CMAX\_L}$ |
| 01 | $P_{CMAX\_L} < P_{CMAX} \leq P_{CMAX\_L} + (P_{CMAX\_H} - P_{CMAX\_L})/2$ |
| 10 | $P_{CMAX\_L} + (P_{CMAX\_H} - P_{CMAX\_L})/2 < P_{CMAX} \leq P_{CMAX\_H}$ |
| 11 | $P_{CMAX} = P_{CMAX\_H}$ |

2) Method B

| Bit | Meaning |
|---|---|
| 00 | $P_{CMAX\_L} \leq P_{CMAX} \leq P_{CMAX\_L} + (P_{CMAX\_H} - P_{CMAX\_L})/4$ |
| 01 | $P_{CMAX\_L} + (P_{CMAX\_H} - P_{CMAX\_L})/4 < P_{CMAX} \leq P_{CMAX\_L} + 2 * (P_{CMAX\_H} - P_{CMAX\_L})/4$ |
| 10 | $P_{CMAX\_L} + 2 * (P_{CMAX\_H} - P_{CMAX\_L})/4 < P_{CMAX} \leq P_{CMAX\_L} + 3 * (P_{CMAX\_H} - P_{CMAX\_L})/4$ |
| 11 | $P_{CMAX\_L} + 3 * (P_{CMAX\_H} - P_{CMAX\_L})/4 < P_{CMAX} \leq P_{CMAX\_H}$ |

In the third method, the power reduction is reported on behalf of the PCMAX value.

3) Method C

| Bit | Meaning |
|---|---|
| 00 | 0 < Power Reduction < K/4 |
| 01 | K/4 < Power Reduction < 2K/4 |
| 10 | 2K/4 < Power Reduction < 3K/4 |
| 11 | 3K/4 < Power Reduction < K |

In the third method, K is equal to $P_{CMAX\_H} - P_{CMAX\_L}$. The aspects of the present invention can be addressed with any of the three provided methods.

Second Exemplary Embodiment

In the first exemplary embodiment, the two reserved bits of the power headroom MAC CE are used to notify the eNB of $P_{CMAX}$. This is advantageous to notify the eNB of $P_{CMAX}$ without increase of overhead, but disadvantageous because two bits are often not enough to report $P_{CMAX}$ accurately. In order to report more accurately $P_{CMAX}$, the UE can use a new MAC CE. That is, the UE can use a MAC CE newly defined to indicate the $P_{CMAX}$ value more accurately, such that when a predetermined condition is fulfilled, the UE reports the $P_{CMAX}$ to the eNB.

Figure 8:
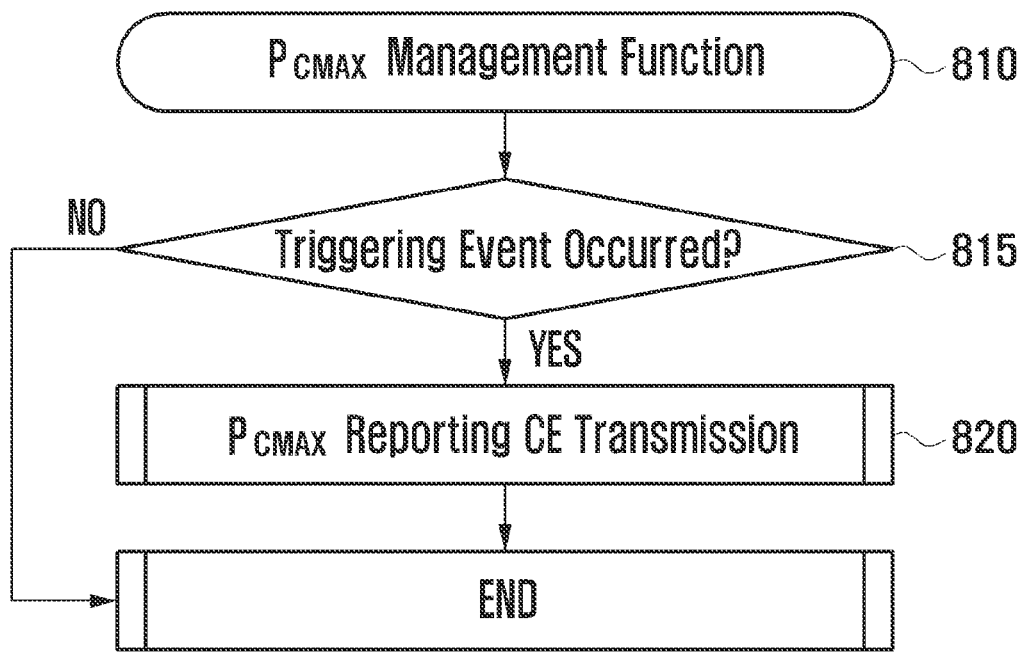
FIG. 8 is a flowchart illustrating a procedure for a UE to report $P_{CMAX}$ according to a second exemplary embodiment of the present invention.

FIG. 8 is a flowchart illustrating a procedure for a UE to report $P_{CMAX}$ according to a second exemplary embodiment of the present invention.

Referring to FIG. 8, a $P_{CMAX}$ Management Function is invoked at step 810. The UE determines whether a predetermined condition is fulfilled at step 815 and, if the condition is fulfilled, generates the MAC CE (maximum transmit power report message) to report $P_{CMAX}$ to the eNB at step 820.

Figure 9:
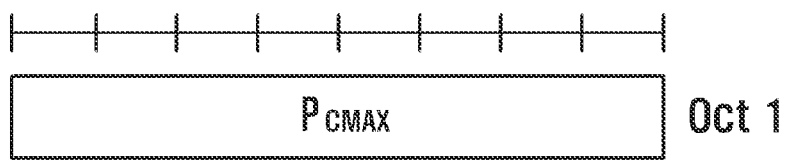
FIG. 9 is a diagram illustrating a format of a MAC CE (maximum transmit power report message) for a UE to report $P_{CMAX}$ to an eNB according to the second exemplary embodiment of the present invention.

FIG. 9 is a diagram illustrating a format of a MAC CE (maximum transmit power report message) for a UE to report $P_{CMAX}$ to an eNB according to the second exemplary embodiment of the present invention.

The conditions to determine a $P_{CMAX}$ report can be as follows:

Power reduction is performed as much as or greater than a predetermined amount;

Selected $P_{CMAX}$ differs from $P_{CMAX\_L}$;

Selected $P_{CMAX}$ differs from $P_{CMAX\_H}$; and

Power reduction is performed in a different way from a recently reported power reduction, i.e., $(P_{CMAX} - P_{CMAX\_L})/(P_{CMAX\_H} - P_{CMAX})$ If the power is reduced as much as or greater than a predetermined amount, this may indicate that the difference between a most recently reported maximum transmit power and a currently reported maximum transmit power is greater than a predetermined reference value.

In a case where one of the above conditions is fulfilled, the UE generates the MAC CE to report $P_{CMAX}$ to the eNB. With the MAC CE received from the UE, the eNB can check the $P_{CMAX}$ determined by the UE accurately. At this time, the UE can also trigger the PHR.

Third Exemplary Embodiment

In a case where the UE reports the $P_{CMAX}$ value to the eNB whenever the $P_{CMAX}$ is reset, as in the first and second exemplary embodiments, it is necessary to allocate resources for a $P_{CMAX}$ report repeatedly. However, if the eNB manages the information on the $P_{CMAX}$ per UE's situation and/or power reduction occurred at the UE accumulatively in the form of a database, it is possible to determine the $P_{CMAX}$ to be used and/or power reduction amount per UE's situation without periodic report after the collection of enough information.

Figure 10:
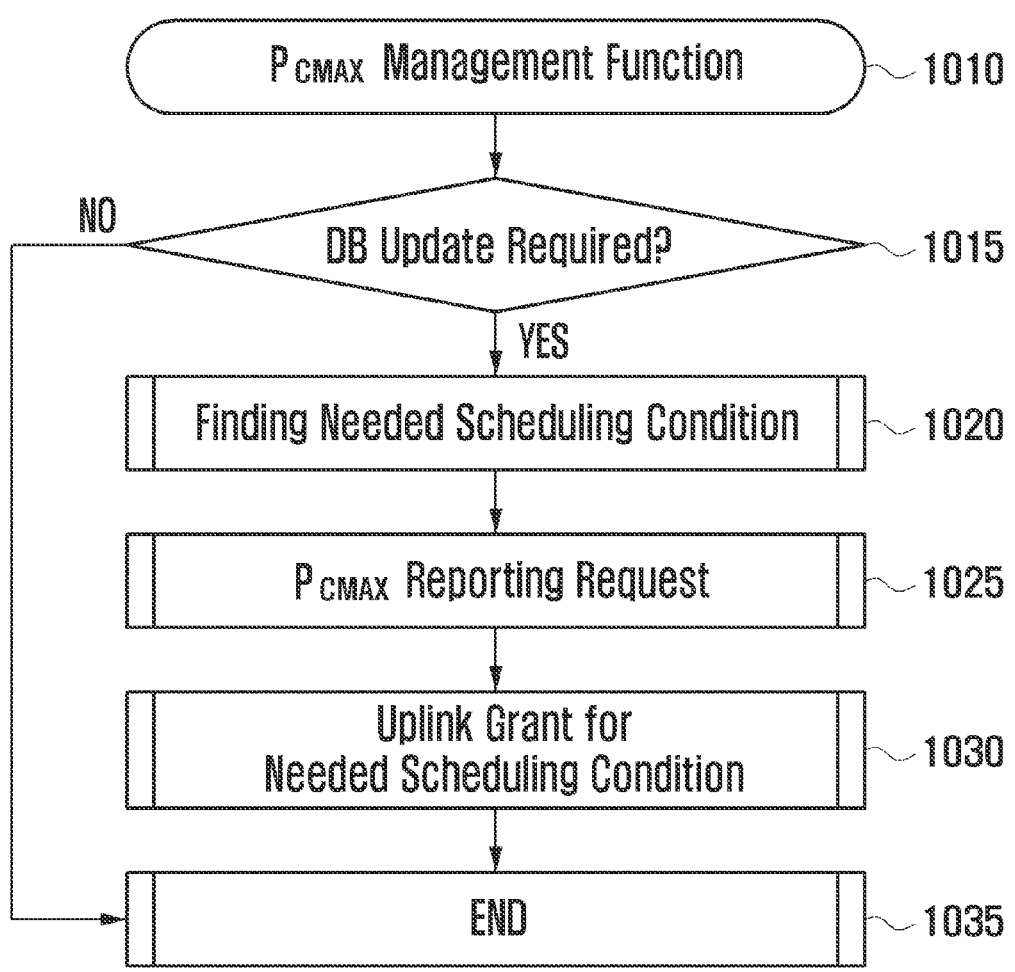
FIG. 10 is a flowchart illustrating a procedure for an eNB to manage $P_{CMAX}$ or power reduction of a UE in a form of a database according to a third exemplary embodiment of the present invention.

FIG. 10 is a flowchart illustrating a procedure for an eNB to manage $P_{CMAX}$ or power reduction of a UE in the form of a database according to a third exemplary embodiment of the present invention.

Referring to FIG. 10, a $P_{CMAX}$ management function is invoked at step 1010. Then an eNB collects the $P_{CMAX}$ value (or power reduction amount) according to scheduling situation and, when database update is determined to be required at step 1015, determines which scheduling condition is needed at step 1020. The eNB sends the UE a $P_{CMAX}$ reporting request message at step 1025 and then transmits an uplink grant reflecting the scheduling condition to the UE at step 1030. The UE reports $P_{CMAX}$ using the resource indicated by the uplink grant. In order to help understand this, a description is made with an exemplary case where the eNB records the power reduction information on UE1 as shown in Table 2:

TABLE 2

| Modulation | Channel bandwith/Transmission bandwith configuration (RB) | | | | | | Power reduction of UE 1 (dB) |
|---|---|---|---|---|---|---|---|
| | 1.4 MHz | 3.0 MHz | 5 MHz | 10 MHz | 15 MHz | 20 MHz | |
| QPSK | >5 | >4 | >8 | >12 | >16 | >18 | 1 |
| 16 QAM | ≤5 | ≤4 | ≤8 | ≤12 | ≤16 | ≤18 | 1 |
| 16 QAM | >5 | >4 | >8 | >12 | >16 | >18 | ? |

Referring to Table 2, in a case where the UE1 is configured with a Quadrature Phase Shift Keying (QPSK) modulation scheme and 8 or more Resource Blocks (RBs) in bandwidth of 5 MHz, the transmit power is reduced by 1 dB. In another case where the UE1 is configured with a 16 Quadrature Amplitude Modulation (QAM) modulation scheme and 8 or fewer RBs in the same bandwidth, the transmit power is reduced by 1 dB. In this manner, the eNB creates a database for storing information on the transmit power reduction according to the resource usage conditions and uses the database for resource allocation afterward.

Referring to Table 2, the eNB has no information on power reduction for the case where the 16 QAM modulation scheme is used and the number of RBs for each bandwidth is equal to or greater than a predetermined number. In such a situation where the eNB has not been updated yet, the eNB requests the UE to report power reduction information. In the above example, the eNB transmits the MAC CE requesting the UE1 for the power reduction report and instructs, with the first uplink grant, the UE1 to configure the transmission with 16 QAM modulation scheme and 18 RBs. If an uplink grant is received after the receipt of the MAC control message requesting the power reduction report, the UE1 transmits the MAC CE containing the power reduction value in a next uplink transmission.

The eNB receives the MAC CE containing the power reduction value and updates the database with the power reduction value. In the next resource allocation process, the eNB can estimate the power reduction amount according to UE's condition by referencing the database.

In FIG. 10, the power reduction report is identical with the $P_{CMAX}$ report. That is, the eNB can request from the UE a $P_{CMAX}$ report, and the UE can report the selected $P_{CMAX}$ to the eNB. At this time, the UE can transmit the PHR along with the $P_{CMAX}$.

Figure 11:
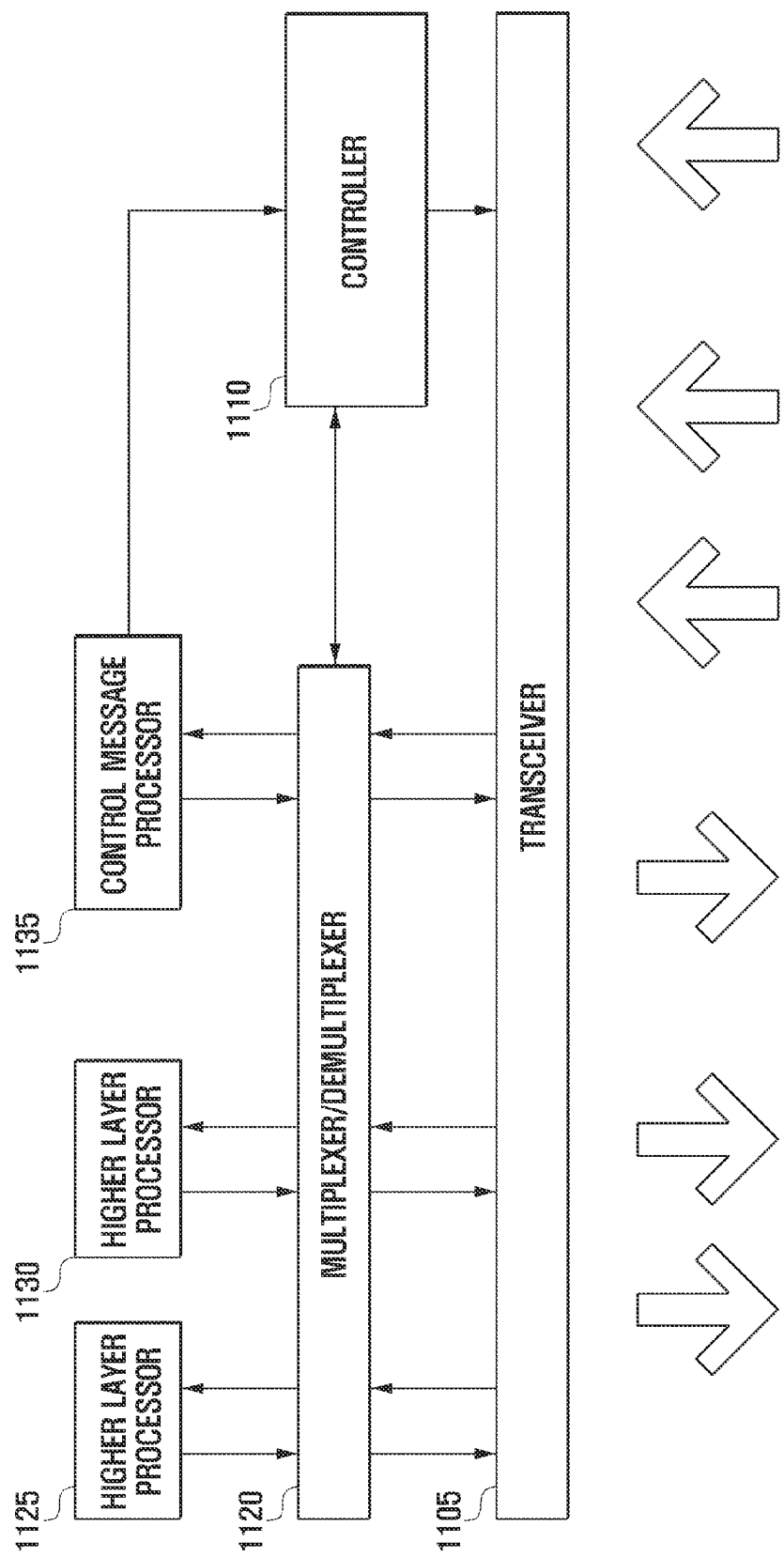
FIG. 11 is a block diagram illustrating a configuration of a UE according to an exemplary embodiment of the present invention.

FIG. 11 is a block diagram illustrating a configuration of a UE according to an exemplary embodiment of the present invention.

Referring to FIG. 11, the UE includes a transceiver 1105, a controller 1110, a multiplexer/demultiplexer 1120, a control message processor 1135, and higher layer processors 1125 and 1130.

The transceiver 1105 is responsible for receiving data and control signals on a downlink carrier and for transmitting data and control signals on an uplink carrier. In a case where multiple carriers are aggregated, the transceiver 1105 can transmit/receive data and control signals on multiple carriers. Particularly in an exemplary embodiment of the present invention, the transceiver 1105 can send to the UE the scheduling information including a maximum transmit power information of the UE, a power headroom MAC CE, and a maximum transmit power report message which is newly defined herein.

The multiplexer/demultiplexer 1120 is responsible for multiplexing the data generated by the higher layer processors 1125 and 1130 and the control message processor 1135 and demultiplexing the data received by the transceiver 1135, and delivers the demultiplexed data to the higher layer processors 1125 and 1130, the control message processor 1135, and/or the controller 1110.

The control message processor 1135 is responsible for processing control messages received from the network. The control message processor 1135 extracts parameters related to the determination of $P_{CMAX}$, e.g., $P_{EMAX}$, among the parameters carried in the control message, and delivers the extracted parameters to the controller 1110.

The higher layer processors 1125 and 1130 can be differentiated according to services, and process and deliver data generated in association with user services such as File Transfer Protocol (FTP) and VoIP to the multiplexer/demultiplexer 1120, or process and deliver data processed by the multiplexer/demultiplexer 1120 to the higher layer service applications.

The controller 1110 interprets a scheduling command, e.g., an uplink grant, received by means of the transceiver 1105, and controls the transceiver 1105 and the multiplexer/demultiplexer 1120 to perform an uplink transmission at a timing and with resources indicated by the scheduling command.

Particularly in an exemplary embodiment of the present invention, the controller 1110 controls overall processes for determining a maximum transmit power ($P_{CMAX}$) of the UE and a power headroom of the UE based on the maximum transmit power, and transmitting the scheduling information containing the maximum transmit power and power headroom to the eNB. Here, the maximum transmit power is determined separately from the transmit power of the uplink transmission of the UE.

According to the first exemplary embodiment of the present invention, the controller 1110 controls such that the maximum transmit power is reported to the eNB using 2 bits of the power headroom MAC CE message.

According to the second exemplary embodiment of the present invention, the controller 1110 controls such that the maximum transmit power is transmitted to the eNB in the maximum transmit power report message only when a predetermined condition is fulfilled. In this case, the maximum transmit power report message is delivered to the multiplexer/demultiplexer 1120.

According to the third exemplary embodiment of the present invention, maximum transmit powers corresponding to the UE's conditions are stored and managed by the eNB in the form of a database, and the controller 1110 controls such that a maximum transmit power is transmitted to the eNB in response to the maximum transmit power report request generated when a predetermined condition is fulfilled.

Figure 12:
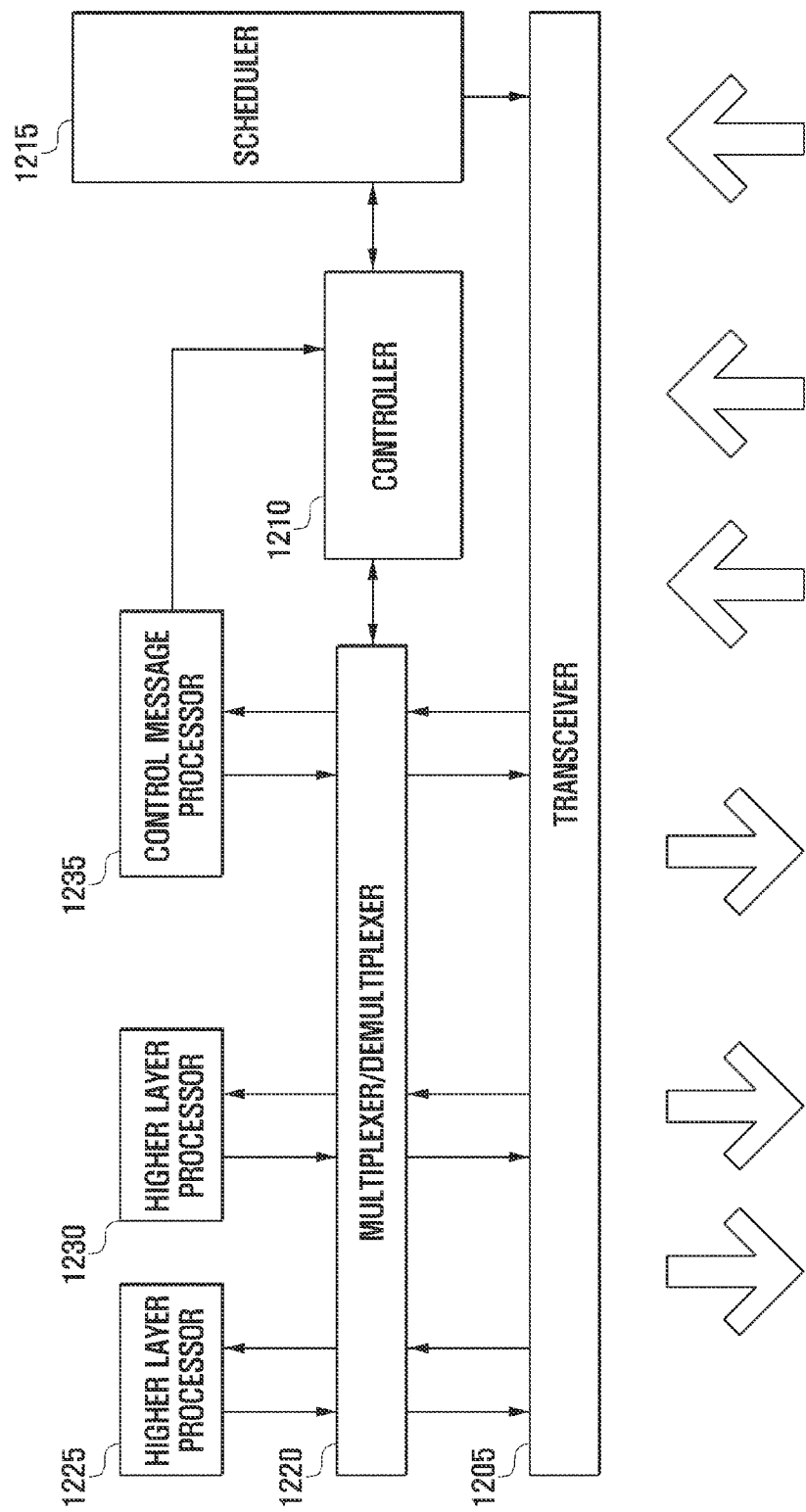
FIG. 12 is a block diagram illustrating a configuration of an eNB according to an exemplary embodiment of the present invention.

FIG. 12 is a block diagram illustrating a configuration of an eNB according to an exemplary embodiment of the present invention.

Referring to FIG. 12, an eNB includes a transceiver 1205, a controller 1210, a multiplexer/demultiplexer 1220, a control message processor 1235, higher layer processors 1225 and 1230, and a scheduler 1215.

The transceiver 1205 is responsible for transmitting data and control signals on a downlink carrier and for receiving data and controls signal on an uplink carrier. In a case where multiple carriers are aggregated, the transceiver 1205 can transmit/receive data and control signals on multiple carriers.

The multiplexer/demultiplexer 1220 is responsible for multiplexing the data generated by the higher layer processors 1225 and 1230 and the control message processor 1235 and demultiplexing the data received by the transceiver 1205 and delivers the demultiplexed data to the higher layer processors 1225 and 1230, the control message processor 1235, and/or the controller 1210.

The control message processor 1235 is responsible for processing control messages received from the UE to execute necessary operations and for generating a control message to be transmitted to the UE, and delivers the control message to the higher layer. For example, the control message processor 1235 delivers $P_{PowerClass}$ information transmitted by the UE to the controller 1210.

The higher layer processors 1225 and 1230 can be differentiated according to services, and process and deliver data generated in association with user services such as FTP and VoIP to the multiplexer/demultiplexer 1220, or process and deliver data processed by the multiplexer/demultiplexer 1220 to the higher layer service applications.

The controller 1210 processes a MAC CE received from the UE and delivers scheduling-related information to the scheduler 1215. For example, the controller 1210 interprets a PHR received from the UE and notifies the scheduler 1215 of the power headroom. The controller 1210 can predict a value of $P_{CMAX}$ (which is selected by the UE according to the situation based on the power headroom and $P_{CMAX}$ reported by means of the PHR, i.e., the controller 1210 manages $P_{CMAX}$ values appropriate for different situations in the form of a database. The controller 1210 also notifies the scheduler 1215 of a maximum transmission resource amount and coding rate available for the UE at a certain time point. The controller 1210 controls the multiplexer/demultiplexer 1220 to generate downlink data based on scheduling information provided by the scheduler 1215 to the transceiver 1205. The controller 1210 also generates the MAC CE requesting the UE for the $P_{CMAX}$ report to the multiplexer/demultiplexer 1220.

The scheduler 1215 allocates transmission resources to the UE in consideration of a buffer state, a channel state, and a power headroom state, and controls the transceiver to process a signal received from the UE and to transmit a signal to the UE.

Fourth Exemplary Embodiment

In a fourth embodiment of the present invention, a method and apparatus for reporting $P_{CMAX}$ in a system using carrier aggregation are provided. The carrier aggregation is a technique in which multiple carriers are aggregated to increase a transmission bandwidth for the UE and is defined in the 3rd Generation Partnership Project (3GPP) REL-10 standard. The UE supporting carrier aggregation includes a Primary cell (PCell) and a Secondary Cell (SCell). Here, a cell is a set of carriers and can include downlink carriers or downlink and uplink carriers. In a case where the UE is configured to operate with multiple carriers (or multiple cells), each cell is activated and deactivated alternately under the control of the eNB in order to minimize battery power consumption. The UE receives downlink data and transmits uplink data in the activated cell according to the scheduling of the eNB. The PCell is always activated, while the SCell is activated and deactivated alternately under the control of the eNB.

According to the fourth exemplary embodiment of the present invention, if PHR is triggered while carrier aggregation is deactivated, the UE reports only the PH, i.e., the difference between $P_{CMAX}$ and PUSCH power. Otherwise, if PHR is triggered while carrier aggregation is activated, the UE reports the PH and $P_{CMAX}$. This is because when carrier aggregation is activated the uplink data can be transmitted through multiple channel and multiple carriers simultaneously, and thus the probability of a transmit power shortage caused by the uncertainty of the $P_{CMAX}$ increases as compared to a single carrier transmission.

Figure 13:
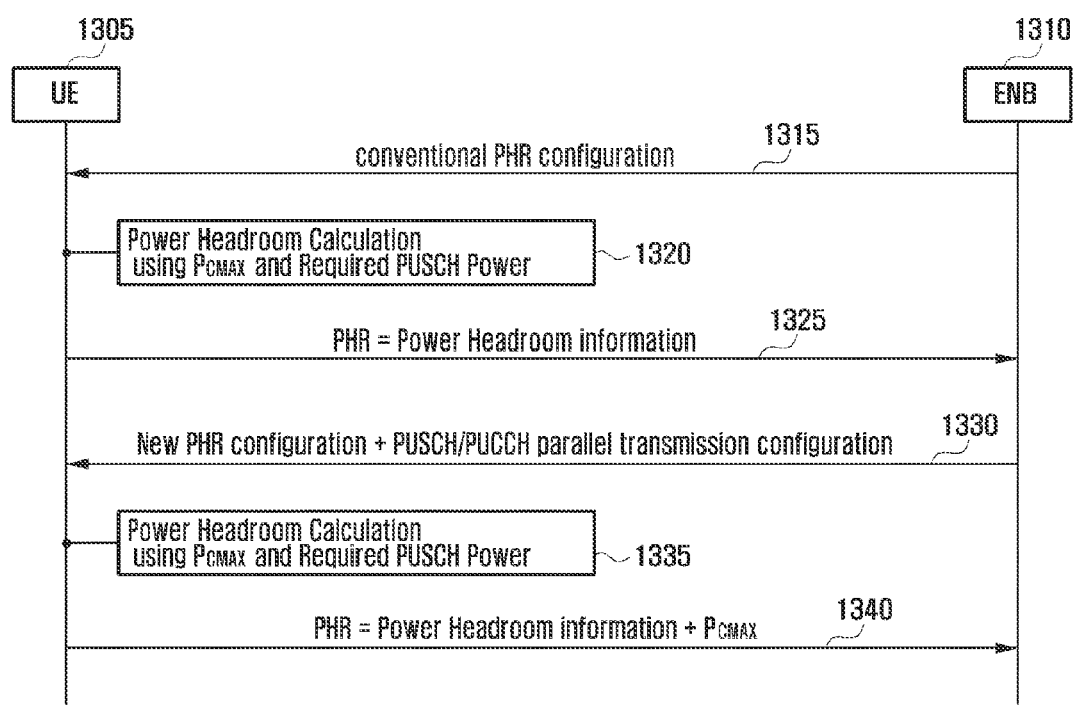
FIG. 13 is a signaling diagram illustrating operations of a UE and an eNB for a method according to a fourth exemplary embodiment of the present invention.

FIG. 13 is a signaling diagram illustrating operations of a UE and an eNB for a method according to a fourth exemplary embodiment of the present invention.

Referring to FIG. 13, the eNB 1310 configures PHR in a state connected to the UE 1305 at a certain time point at step 1315. The PHR is significant information for uplink scheduling of the eNB 1310 such that, when the UE 1305 transitions to the connected state, the eNB 1310 configures the PHR of the UE 1305. At this time, since the UE 1305 transitioning from the idle state to the connected state cannot operate on multiple carriers, the PHR is configured according to the related art at that time point.

In a PHR configuration function of the related art, the UE 1305 triggers PHR when a certain condition is fulfilled. The condition can be the receipt of a first uplink grant after PHR configuration, or a variation of path-loss greater than a predetermined value at a time point when an uplink transmit resource is available.

If PHR is triggered, the UE 1305 calculates a required PUSCH power using an allocated uplink transmission resource, MCS, path-loss, and accumulated transmit power control command value at step 1320. The UE 1305 also selects a $P_{CMAX}$ value that can meet the spurious emission requirement between $P_{CMAX\_H}$ and $P_{CMAX\_L}$. The UE 1305 also determines PH by calculating a difference between the selected $P_{CMAX}$ and the required PUSCH transmission power.

Next, the UE 1305 reports the PH to the eNB 1310 using a PHR MAC CE of the related art at step 1325.

At a certain time afterward, the eNB 1310 sends the UE 1305 a control message to configure carrier aggregation at step 1330. That is, the eNB 1310 configures at least one SCell cell to the UE 1305. For example, when the traffic of the UE 1305 increases, the eNB 1310 can activate carrier aggregation. In this case, while configuring the carrier aggregation for the UE 1305, the eNB 1310 can configure a new PHR function with the same control message or a separate control message.

If the PHR is triggered, the UE 1305 reports the PH for all of the activated uplink carriers (hereinafter, uplink carrier is used synonymously with SCell) and $P_{CMAX}$ for the all or some of the activated uplink carriers to the eNB 1310. For example, in a case where the uplink carriers have the same $P_{CMAX}$, the $P_{CMAX}$ of one of the uplink carriers is reported.

The control message for configuring the carrier aggregation can contain the following information as well as information on the newly configured carriers.

Information for indicating whether to use the new PHR function

Information for indicating whether to transmit the PUSCH and Physical Uplink Control Channel (PUCCH) in parallel.

If the first information indicates no use of the new PHR function, the UE 1305 deactivates the PHR function. In other words, the new PHR function can be used or not by the UE 1305, but the PHR function of the related art is no longer used.

The second information instructs the UE 1305 whether to transmit PUSCH and PUCCH in parallel in the PCell or not. PUCCH is a control channel for transmitting Hybrid Automatic Repeat Request (HARQ) feedback and downlink Channel Quality Indicator (CQI) and is used only in the PCell. The eNB 1310 instructs the UE 1305 to configure to transmit both the PUSCH and PUCCH in parallel, or one of PUSCH and PUCCH in consideration of the channel condition or capability of the UE 1305.

In a case where the PUSCH and PUCCH are not transmitted in parallel, the PUSCH is piggybacked on the PUSCH, resulting in a performance degradation of the PUSCH transmission. Accordingly, it is preferred that the PUSCH and PUCCH are configured to be transmitted in parallel as much as the UE's condition allows. If the PUSCH and PUCCH are configured to be transmitted in parallel and if PHR is triggered, the UE 1305 reports a type 2 PH and a $P_{CMAX}$ used for type 2 PH calculation to the eNB 1310. The type 2 PH is the value defined as follows:

Type 2 PH=$P_{CMAX}$ of PCell—PUSCH power—PUCCH power

In a case where the UE 1305 transmits PUCCH and PUSCH in parallel in the PCell, the type 2 PH is used for providing the eNB 1310 with information on the transmit power condition for a simultaneous transmission of PUCCH and PUSCH.

If PHR is triggered, the UE 1305 determines $P_{CMAX}$ for the activated cells at a corresponding time point and calculates a transmit power of PUSCH at step 1335. The UE 1305 determine a PH per cell based on the above information. The UE 1305 generates a PHR MAC CE containing the calculated PH value and $P_{CMAX}$ per cell and transmits the PHR MAC CE to the eNB 1310 at step 1340. In a case where the PUSCH and PUCCH are configured to be transmitted in parallel, the UE 1305 calculates type 2 PH using the $P_{CMAX}$ and PUSCH transmit power of the PCell and PUCCH transmit power, and transmits the PHR MAC CE containing the type 2 PH and $P_{CMAX}$ used for calculating the type 2 PH to the eNB 1310.

Figure 14:
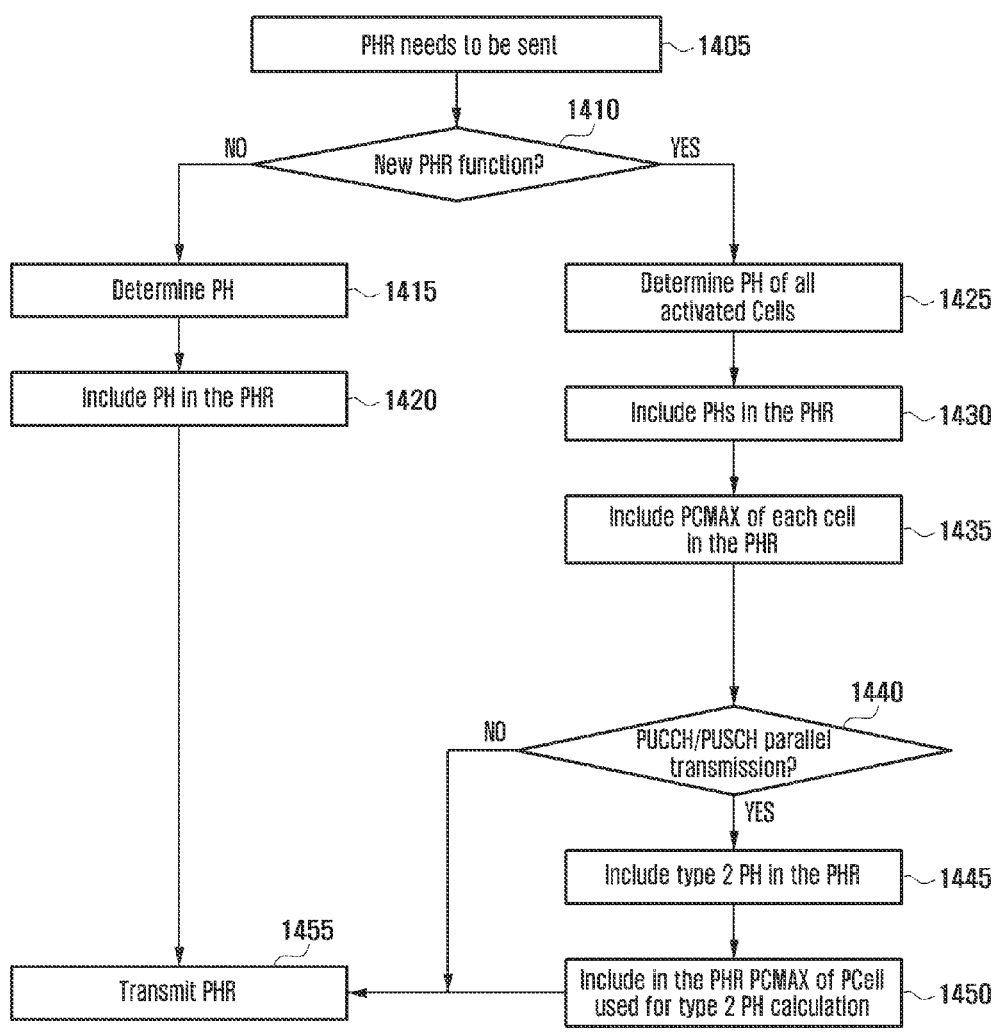
FIG. 14 is a flowchart illustrating a procedure of a UE in a method according to the fourth exemplary embodiment of the present invention.

FIG. 14 is a flowchart illustrating a procedure of a UE in a method according to the fourth exemplary embodiment of the present invention.

Referring to FIG. 14, a PHR transmission-necessary situation occurs at step 1405. This is the state wherein there is a PHR which is not canceled yet although a new uplink transmission resource becomes available for the UE configured with a PHR function of the related art or the new PHR function. The UE determines whether the configured PHR function is the new PHR function or the PHR function of the related art at step 1410.

Here, the PHR function of the related art is a PHR function performed regardless of a carrier aggregation operation such that, when a PHR is triggered, the UE calculates and reports a PH to the eNB. Meanwhile, the new PHR function is a PHR function associated with the carrier aggregation operation such that, when the PHR is triggered, the UE calculates PHs of all the uplink carriers (or cells to which uplink transmission resources are configured) and reports the PHs and $P_{CMAX}$ used for PH calculation.

As described above, when the carrier aggregation operation is configured in the UE, the UE receives a command instructing whether to activate the new PHR function. If the current PHR function is the PHR function of the related art, the UE calculates the PH at step 1415, inserts the PH into the PHR at step 1420, and transmits the PHR to the eNB at step 1455.

If the current PHR function is the new PHR function, the procedure goes to step 1425. At step 1425, the UE calculates PHs of all the uplink carriers activated at a corresponding time point (or cells to which uplink transmission resources are configured). Next, the UE inserts the calculated PHs into the PHR at step 1430. Next, the UE inserts $P_{CMAX}$ used for calculating the PHs into the PHR along with the PHs at step 1435.

Next, the UE determines whether parallel PUCCH and PUSCH transmission is configured at step 1440. If parallel PUCCH and PUSCH is configured, the procedure goes to step 1445. Otherwise, if parallel PUCCH and PUSCH is not configured, the UE transmits the PHR to the eNB at step 1455.

At step 1445, the UE calculates a type 2 PH by subtracting the PUSCH transmit power and required PUCCH transmit power from $P_{CMAX}$ of the PCell. The calculated type 2 PH is inserted into the PHR. Next, the UE inserts the $P_{CMAX}$ of the PCell used for calculating the type 2 PH into the PHR at step 1450 and transmits the PHR to the eNB at step 1455.

A description is made of another procedure for determining whether the $P_{CMAX}$ is included in the PHR using other criteria according to another exemplary embodiment of the present invention.

Figure 15:
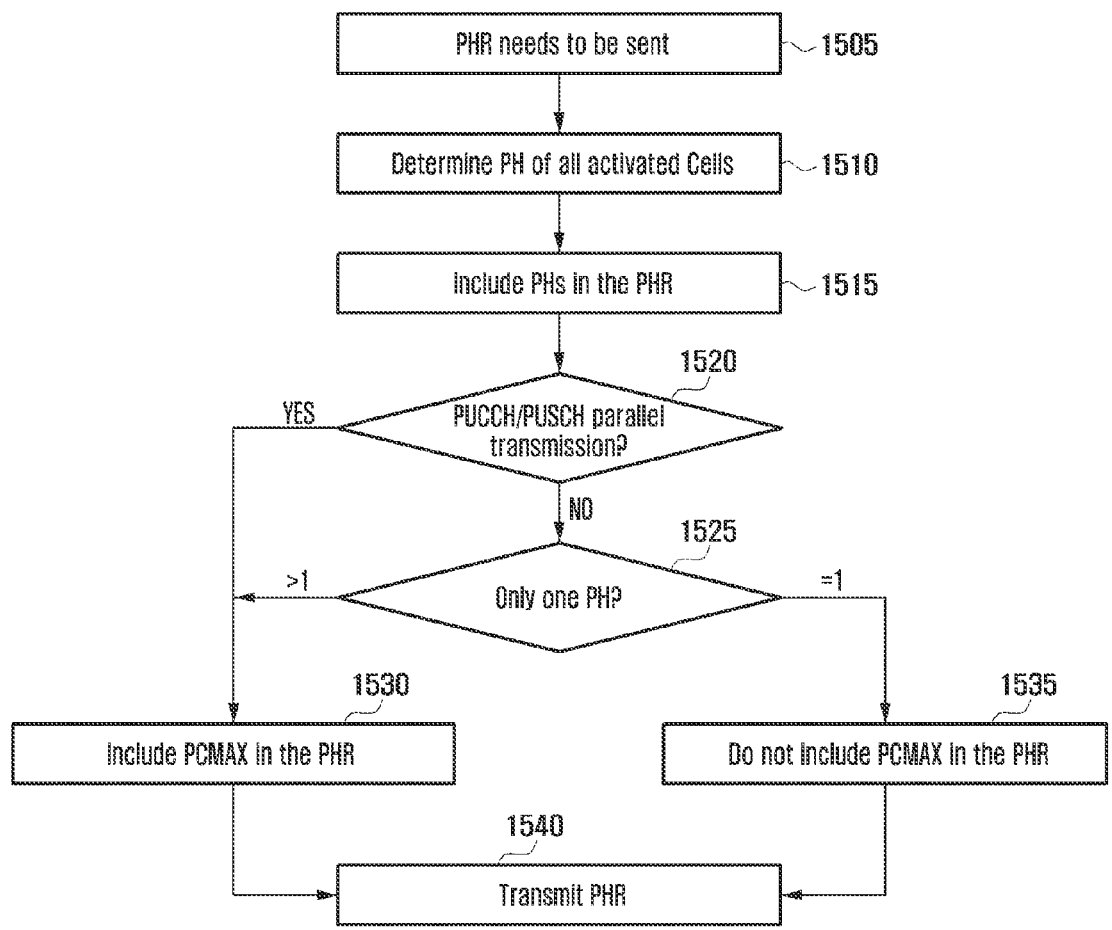
FIG. 15 is a flowchart illustrating a procedure of a UE in a method according to a modified case of the fourth exemplary embodiment of the present invention.

FIG. 15 is a flowchart illustrating a procedure of a UE in a method according to a modified case of the fourth exemplary embodiment of the present invention.

Referring to FIG. 15, if a PHR transmission-necessary situation occurs at step 1505, the UE calculates PHs of all the uplink carriers activated at the corresponding time point at step 1510. Next, the UE inserts the calculated PHs into a PHR at step 1515.

Next, the UE checks whether parallel PUCCH and PUSCH transmission is configured at step 1520 and, if so, determines that the $P_{CMAX}$ report necessity is very high and therefore the UE inserts $P_{CMAX}$ into the PHR at step 1530.

Otherwise, if parallel PUCCH and PUSCH transmission is not configured, the UE determines whether a number of PHs included in the PHR is 1 or more at step 1525. If the number of PHs included in the PHR is 1, this means that one uplink subcarrier is activated at the corresponding time point and the $P_{CMAX}$ report necessity is low as compare to the multicarrier situation, and, as a consequence, the UE does not insert the $P_{CMAX}$ into the PHR at step 1535. Next, the UE transmits the PHR to the eNB at step 1540. If parallel PUSCH and PUCCH transmission is configured, at least two PHs are included in the PHR, and thus step 1520 can be omitted. That is, if the PHR includes 1 PH, the UE does not insert the $P_{CMAX}$ in the PHR and, otherwise if the PHR includes more than 1 PH, inserts the $P_{CMAX}$ in the PHR.

Since the configuration of the eNB according to the fourth exemplary embodiment is identical with those of the previous exemplary embodiments, a detailed description thereof is omitted herein.

Since the UE according to the fourth exemplary embodiment of the present invention is identical with that of the previous exemplary embodiments except for the operations of the controller, only the operations of the controller are described herein.

When PHR is triggered, the controller 1110 determines whether to insert the $P_{CMAX}$ into the PHR in consideration of the UE's situation. That is, if the new PHR function is configured, the $P_{CMAX}$ is included in the PHR, but if the PHR function of the related art is configured, the $P_{CMAX}$ is excluded from the PHR. If only one PH is included in the PHR, the $P_{CMAX}$ is excluded from the PHR, and otherwise, if more than one PH is included in the PHR, the $P_{CMAX}$ is included in the PHR.

As described above, exemplary embodiments of the present invention enables an eNB to interpret a PHR of a UE accurately, resulting in improvement of scheduling efficiency and mitigation of interference to other transmissions.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for reporting power headroom by a terminal in a mobile communication system, the method comprising:
   receiving information indicating a first power headroom report (PHR) format;
   determining whether a PHR is triggered; and
   transmitting a maximum transmit power ($P_{CMAX}$) and a power headroom (PH) associated with at least one activated carrier in the PHR using the first PHR format, the PH being obtained based on the $P_{CMAX}$.

2. The method of claim 1, wherein the $P_{CMAX}$ and the PH are determined for each serving cell if more than one serving cell is configured.

3. The method of claim 1,
   wherein the first PHR format comprises an extended PHR medium access control (MAC) control element (CE),
   wherein the extended PHR MAC CE comprises at least one PH field and at least one $P_{CMAX}$ field associated with the at least one activated carrier, and
   wherein at least one $P_{CMAX}$ field respectively corresponds to at least one PH field.

4. The method of claim 1, further comprising:
   if a simultaneous transmission a for a physical uplink shared channel (PUSCH) and physical uplink control channel (PUCCH) is configured, obtaining a value of a type 2 PH; and
   transmitting the value of the type 2 PH and a $P_{CMAX}$ used for determining the value of the type 2 PH.

5. The method of claim 4, wherein the value of the type 2 PH is determined based on a $P_{CMAX}$ of a first cell, a PUSCH transmit power and a PUCCH transmit power.

6. A terminal for reporting power headroom (PH) in a mobile communication system, the terminal comprising:
   a transceiver for transmitting and receiving a signal; and
   a controller for controlling to
      receive information indicating a first power headroom report (PHR) format,
      determine whether PHR is triggered, and to
      transmit a maximum transmit power ($P_{CMAX}$) and a power headroom (PH) associated with at least one activated carrier in the PHR using the first PHR format, the PH being obtained based on the $P_{CMAX}$.

7. The terminal of claim 6, wherein the $P_{CMAX}$ and the PH are determined for each serving cell if more than one serving cell is configured.

8. The terminal of claim 6,
   wherein the first PHR format comprises an extended PHR medium access control (MAC) control element (CE),
   wherein the extended PHR MAC CE comprises at least one PH field and at least one $P_{CMAX}$ field associated with the at least one activated carrier, and
   wherein at least one $P_{CMAX}$ field respectively corresponds to at least one PH field.

9. The terminal of claim 6, wherein the controller is further configured to:
   obtain a value of a type 2 PH if a simultaneous transmission for a physical uplink shared channel (PUSCH) and a physical uplink control channel (PUCCH) is configured, and
   transmit the value of the type 2 PH and a $P_{CMAX}$ used for determining the value of the type 2 PH.

10. The terminal of claim 9 wherein the value of the type 2 PH is determined based on a $P_{CMAX}$ of a first cell, a PUSCH transmit power and a PUCCH transmit power.

11. A base station for receiving a power headroom report (PHR) in a mobile communication system, the base station comprising:
   a transceiver configured to transmit and receive a signal; and
   a controller configured to:
      identify information indicating a first PHR format based on a number of activated uplink carriers for a terminal,
      transmit a control message comprising the information, and
      receive a maximum transmit power ($P_{CMAX}$) and a power headroom (PH) associated with at least one activated uplink carrier for the terminal using the first PHR format, the PH being obtained based on the $P_{CMAX}$.

12. The base station of claim 11, wherein the $P_{CMAX}$ and the PH are determined for each serving cell if more than one serving cell is configured.

13. The base station of claim 11,
   wherein the first PHR format comprises an extended PHR medium access control (MAC) control element (CE),
   wherein the extended PHR MAC CE comprises at least one PH field and at least one $P_{CMAX}$ field associated with the at least one activated uplink carrier, and
   wherein at least one $P_{CMAX}$ field respectively corresponds to at least one PH field.

14. The base station of claim 11, wherein the controller is further configured to control to receive a value of a type 2 PH and a $P_{CMAX}$ used for determining the value of the type 2 PH if a simultaneous transmission for a physical uplink shared channel (PUSCH) and a physical uplink control channel (PUCCH) is configured.

15. The base station of claim 14, wherein the value of the type 2 PH is determined based on a $P_{CMAX}$ of a first cell, a PUSCH transmit power and a PUCCH transmit power.

16. A method for receiving a power headroom report (PHR) by a base station in a mobile communication system, the method comprising:

identifying information indicating a first PHR format based on a number of activated uplink carriers for a terminal;

transmitting a control message comprising the information; and receiving a maximum transmit power ($P_{CMAX}$) and a power headroom (PH) associated with at least one activated uplink carrier for the terminal using the first PHR format, the PH being obtained based on the $P_{CMAX}$.

17. The method of claim 16, wherein the $P_{CMAX}$ and the PH are determined for each serving cell if more than one serving cell is configured.

18. The method of claim 16, wherein the first PHR format comprises an extended PHR medium access control (MAC) control element (CE), wherein the extended PHR MAC CE comprises at least one PH field and at least one $P_{CMAX}$ field associated with the at least one the activated uplink carrier for the terminal, and wherein at least one $P_{CMAX}$ field respectively corresponds to at least one PH field.

19. The method of claim 16, further comprising:

if a simultaneous transmission for a physical uplink shared channel (PUSCH) and physical uplink control channel (PUCCH) is configured, receiving a value of the type 2 PH and a $P_{CMAX}$ used for determining the value of type 2 PH.

20. The method of claim 19, wherein the value of the type 2 PH is determined based on a $P_{CMAX}$ of a first cell, a PUSCH transmit power and a PUCCH transmit power.

* * * * *

UNITED STATES PATENT AND TRADEMARK OFFICE
CERTIFICATE OF CORRECTION

| | |
|---|---|
| PATENT NO. | : 9,439,156 B2 |
| APPLICATION NO. | : 14/231908 |
| DATED | : September 6, 2016 |
| INVENTOR(S) | : Sang Soo Jeong et al. |

It is certified that error appears in the above-identified patent and that said Letters Patent is hereby corrected as shown below:

On the Title Page

In item (54), delete "MOBILE TERMINAL AND METHOD OF DISPLAYING IMAGE USING THE SAME" and insert --METHOD AND APPARATUS FOR REPORTING MAXIMUM TRANSMISSION POWER IN WIRELESS COMMUNICATION--

Signed and Sealed this
Twelfth Day of May, 2020

Andrei Iancu
*Director of the United States Patent and Trademark Office*